(12) United States Patent
Boyana et al.

(10) Patent No.: US 9,367,207 B2
(45) Date of Patent: Jun. 14, 2016

(54) MOBILE TERMINAL AND CONTROL METHOD THEREOF

(71) Applicant: LG ELECTRONICS INC., Seoul (KR)

(72) Inventors: Ashesh Chagana Boyana, Karnataka (IN); Rajesh Nagaraja Rao, Karnataka (IN)

(73) Assignee: LG Electronics Inc., Seoul (KR)

( * ) Notice: Subject to any disclaimer, the term of this patent is extended or adjusted under 35 U.S.C. 154(b) by 27 days.

(21) Appl. No.: 13/940,922

(22) Filed: Jul. 12, 2013

(65) Prior Publication Data

US 2014/0208269 A1   Jul. 24, 2014

(30) Foreign Application Priority Data

Jan. 22, 2013   (KR) .................. 10-2013-0007146

(51) Int. Cl.
*G06F 3/041* (2006.01)
*G06F 3/0481* (2013.01)
*H04M 1/66* (2006.01)
*G06F 3/0482* (2013.01)
*H04M 1/725* (2006.01)

(52) U.S. Cl.
CPC .......... *G06F 3/04817* (2013.01); *G06F 3/0482* (2013.01); *H04M 1/66* (2013.01); *H04M 1/72544* (2013.01); *H04M 2250/22* (2013.01)

(58) Field of Classification Search
CPC ...... H04M 1/67; G06F 3/0483; G06F 3/0482; G06F 3/0488
USPC ........... 345/173, 174; 455/411, 566; 715/863; 726/19
See application file for complete search history.

(56) References Cited

U.S. PATENT DOCUMENTS

| | | | |
|---|---|---|---|
| 8,136,053 B1* | 3/2012 | Miller et al. ................ 715/863 |
| 8,219,936 B2* | 7/2012 | Kim et al. .................. 715/862 |
| 8,504,842 B1* | 8/2013 | Meacham ................... 713/183 |
| 8,583,139 B2* | 11/2013 | Jung .................. G06Q 10/109 455/414.2 |
| 2008/0122796 A1* | 5/2008 | Jobs et al. ................... 345/173 |
| 2009/0006991 A1 | 1/2009 | Lindberg et al. |
| 2010/0162182 A1* | 6/2010 | Oh et al. ..................... 715/863 |
| 2011/0230161 A1* | 9/2011 | Newman .......... H04M 1/72541 455/404.1 |
| 2012/0088478 A1* | 4/2012 | Kim et al. ................. 455/414.2 |
| 2012/0233571 A1 | 9/2012 | Wever et al. |
| 2012/0266236 A1* | 10/2012 | Miwa ..................... G06F 21/36 726/19 |
| 2012/0284297 A1* | 11/2012 | Aguera-Arcas et al. ...... 707/769 |
| 2013/0053105 A1* | 2/2013 | Lee et al. .................... 455/565 |
| 2013/0063380 A1* | 3/2013 | Wang ................. G06F 3/04883 345/173 |
| 2013/0159878 A1* | 6/2013 | Kim et al. .................... 715/752 |
| 2013/0187831 A1* | 7/2013 | Sirpal et al. ................... 345/1.3 |

FOREIGN PATENT DOCUMENTS

WO   WO 2012/096419 A1   7/2012

* cited by examiner

*Primary Examiner* — Calvin C Ma
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a display unit; and a controller to receive a lock screen input command, display a lock screen on the display unit upon receiving the lock screen input command, receive a predetermined touch input on the lock screen, display a home screen in an overlapping manner with the lock screen on the display unit upon receiving the predetermined touch input on the lock screen, identify an icon displayed at a position on the home screen corresponding to a position of the predetermined touch input among a plurality of icons included in the home screen, and release the lock screen and execute an application corresponding to the identified icon when the predetermined touch input is released.

13 Claims, 18 Drawing Sheets

MOBILE TERMINAL AND CONTROL METHOD THEREOF

CROSS-REFERENCE TO RELATED APPLICATION

Pursuant to 35 U.S.C. §119(a), this application claims the benefit of earlier filing date and right of priority to Korean Application No. 10-2013-0007146, filed on Jan. 22, 2013, the contents of which is incorporated by reference herein in its entirety.

BACKGROUND OF THE INVENTION

1. Field of the Invention

This present invention relates to a mobile terminal, and more particularly, to releasing a lock state of a mobile terminal in a touching manner, and a corresponding control method.

2. Background of the Invention

Terminals may be divided into mobile/portable terminals and stationary terminals. Also, the mobile terminals may be classified into handheld terminals and vehicle mount terminals.

As a mobile terminal is now multifunctional and can be used to capture still images or moving images, play music or video files, play games, receive broadcast and the like, so as to be implemented as an integrated multimedia player. That is, the mobile terminal is now becoming a device capable of using various types of information as well as a voice call function.

Diversifying the functions implemented in the mobile terminal inevitably means an increase in types of applications which selectively execute such functions. Thus, the number of icons to be displayed on a screen of a mobile terminal also increases as more applications are installed by a user in the mobile terminal.

Because of a physical limit of a display due to portability of the mobile terminal, it is not easy to display all the icons corresponding to applications on one screen (or an idle screen). Thus, icons corresponding to applications are placed on a plurality of screens, respectively, and the screens can be scrolled or shifted, if necessary, to execute a predetermined application.

For example, when a drag input in a predetermined direction (for example, in a left or right direction) is sensed, the screen displayed is shifted into a previous or next screen. In addition, at least one of the plurality of screens may be called 'home screen' and each screen may called a 'page.'

Meanwhile, a mobile terminal may include a screen-lock (lock screen) function to prevent a function from being executed unexpectedly. In the lock screen, the user's input is ignored until the screen is unlocked. Therefore, such unexpected input may be prevented.

Therefore, the lock screen must be released to execute functions or features in the mobile terminal. Also, an icon corresponding to an application desired to execute has to be searched by converting the screen into the home screen. That is, a plurality of touch inputs has to be inconveniently applied to execute a specific application.

SUMMARY OF THE INVENTION

Therefore, one object of the present invention is to provide a mobile terminal capable of releasing a lock state and executing a specific application through one touch input, and a control method thereof.

Another object of the present invention is to provide a mobile terminal capable of converting a home screen into another screen and outputting information included in the home screen even in a lock state.

To achieve these and other advantages and in accordance with the purpose of this specification, as embodied and broadly described herein, there is provided a mobile terminal including a display unit to display at least one of a plurality of pages as a home screen, and a controller to control the display unit to convert the home screen into a lock image when a lock state for restricting an input of a control command is executed, wherein the controller may be configured to output the home screen on the display unit when a touch applied onto the display unit is sensed in the lock state. Also, the controller may be configured to search for an icon output on a first position, among icons included in the home screen, when the touch is continuously moved from an initially touched position to the first position and released on the first position. And, the controller may be configured to release the lock state and execute an application corresponding to the searched icon when the icon is searched.

In one aspect of the detailed description, the controller may output shortcut icons for the plurality of pages, respectively, together with the home screen, when the touch applied onto the display unit is sensed in the lock state. Also, the controller may convert the home screen into a page corresponding to one shortcut icon of the shortcut icons when the touch is continuously moved onto the one shortcut icon without being released.

In one aspect of the detailed description, the controller may release the lock state and output a page corresponding to the one shortcut icon when the touch is released on the position of the one shortcut icon.

In one aspect of the detailed description, the controller may output the shortcut icons within a space of the home screen not to overlap at least part of icons included in the home screen.

In one aspect of the detailed description, the controller may adjust transparency of the lock image and output the lock image and the home screen in an overlapping manner when the touch applied onto the display unit is sensed in the lock state.

In one aspect of the detailed description, the controller may output a graphic object, which indicates a position where the touch is sensed, on the display unit in response to the touch. Also, the controller may shift the position of the graphic object in response to the touch as the touch is continuously moved.

In accordance with another exemplary embodiment of the detailed description, there is provided a mobile terminal including a display unit to display at least one of a plurality of pages as a home screen, and a controller to control the display unit to convert the home screen into a lock image when a lock state for restricting an input of a control command is executed, wherein the controller may be configured to output an unlock icon and a home output icon together with the lock image when a touch applied onto the display unit is sensed in the lock state. Also, the controller may be configured to release the lock state when the touch is continuously moved from an initially touched position and released on a position of the unlock icon, and convert the lock image into the home screen when the touch is continuously moved from the initially touched position to a position of the home output icon. And, the controller may be configured to release the lock state and execute an application corresponding to one of icons included in the home screen when the touch is continuously moved to a first position where the one icon is located and released on the first position.

In one aspect of the detailed description, the controller may output shortcut icons for the plurality of pages, respectively, together with the home screen, when the touch is continuously moved from the initially touched position to the position of the home output screen, and convert the home screen into a page corresponding to one of the shortcut icons when the touch is continuously moved onto the one shortcut icon without being released.

In one aspect of the detailed description, the controller may output at least one icon associated with an execution of an application, together with the unlock icon and the home output icon, when the touch applied onto the display unit is sensed in the lock state. Also, the controller may release the lock state and execute an application corresponding to one of the at least one icon when the touch is continuously moved from the initially touched position to a position where the one icon is output and released on the position of the one icon. Here, the at least one icon may change according to a time at which the touch is sensed.

To achieve these and other advantages and in accordance with the purpose of this specification, as embodied and broadly described herein, there is provided a control method for a mobile terminal configured to display at least one of a plurality of pages as a home screen, the method including converting the home screen into a lock image when a lock state for restricting an input of a control command is executed, outputting the home screen on the display unit when a touch applied onto the display unit is sensed in the lock state, searching for one icon output on a first position, among icons included in the home screen, when the touch is continuously moved to the first position and then released on the first position, and releasing the lock state and executing an application corresponding to the one icon when the one icon is output on the first position.

In one aspect of the detailed description, the outputting of the home screen on the display unit may be performed to output shortcut icons for the plurality of pages, respectively, together with the home screen. Here, the method may further include converting the home screen into a page corresponding to one of the shortcut icons when the touch is continuously moved onto the one shortcut icon without being released.

In one aspect of the detailed description, the shortcut icons may be output within a space of the home screen not to overlap at least part of icons included in the home screen. Also, the method may further include releasing the lock state and outputting a page corresponding to the one shortcut icon when the one shortcut icon, other than the one icon included in the home screen, is output on the first position.

In one aspect of the detailed description, the outputting of the home screen on the display unit may be performed to adjust transparency of the lock image and output the lock image and the home screen in an overlapping manner.

In one aspect of the detailed description, the method may further include outputting a graphic object, which indicates a position where the touch is sensed, on the display unit in response to the touch.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Mobile terminals described in this specification may include cellular phones, smart phones, laptop computers, digital broadcasting terminals, personal digital assistants (PDAs), portable multimedia players (PMPs), E-books, navigators, and the like. However, it may be easily understood by those skilled in the art that the configuration according to the embodiment of the present inventions of this specification can be applied to stationary terminals such as digital TV, desktop computers and the like excluding a case of being applicable only to the mobile terminals.

Figure 1:
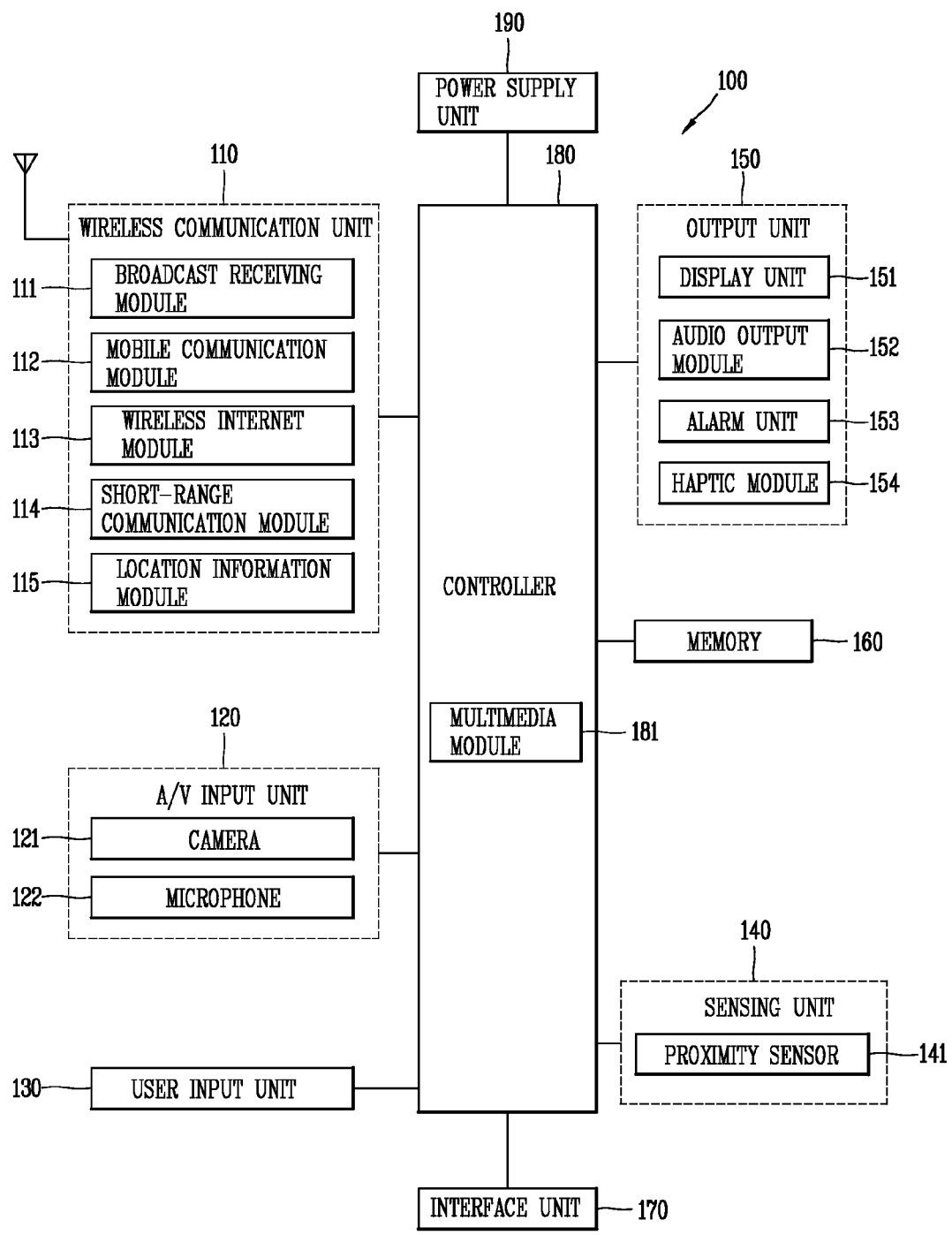
FIG. 1 is a block diagram of a mobile terminal in accordance with an embodiment of the present invention.

FIG. 1 is a block diagram of a mobile terminal 100 in accordance with one embodiment of the present invention. As shown, the mobile terminal 100 may include components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but greater or fewer components may alternatively be implemented.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless Internet module 113, a short-range communication module 114, a location information module 115 and the like.

The broadcast receiving module 111 may receive a broadcast signal and/or broadcast associated information from an external broadcast managing entity via a broadcast channel. Examples of broadcast associated information may include information associated with a broadcast channel, a broadcast program, a broadcast service provider, and the like. The broadcast associated information may be provided via a mobile communication network, and received by the mobile communication module 112. The broadcast signal and broadcast associated information sensed through the broadcast receiving module 111 may be stored in the memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The wireless Internet module 113 may support wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, and the like.

The location information module 115 denotes a module for detecting or calculating a position of a mobile terminal. An example of the location information module 115 may include a Global Position System (GPS) module.

Still referring to FIG. 1, the A/V input unit 120 may be configured to provide audio or video signal input to the mobile terminal. The A/V input unit 120 may include a camera 121 and a microphone 122. The camera 121 may receive and process image frames of still pictures or video obtained by image sensors in a video call mode or a capturing mode. The processed image frames may be displayed on a display unit 151. The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 for a phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The sensing unit 140 may include a proximity sensor 141. Also, the sensing unit 140 may include a touch sensor which senses a touch operation onto the display unit 151.

The touch sensor may be implemented as a form, such as a touch film, a touch sheet, a touch pad and the like. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure.

Here, if the display unit 151 and a touch sensitive sensor (referred to as a touch sensor) have a layered structure therebetween, the display unit 151 may be used as an input device as well as an output device. Such display unit 151 may be referred to as "touch screen."

When touch inputs are sensed through the touch screen, corresponding signals are transmitted to a touch controller. The touch controller processes the received signals, and then transmits corresponding data to the controller 180. Accordingly, the controller 180 can sense which region of the display unit 151 has been touched.

When the touch screen is implemented as a capacitance type, proximity of a pointer to the touch screen is sensed by changes of an electromagnetic field. In this case, the touch screen (touch sensor) may be categorized into a proximity sensor 141.

The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.'

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. That is, the display unit 151 may include first and second surfaces placed in an overlapping manner and the first and second surfaces may be implemented to be transparent or light-transmissive. Under this configuration, a user can view an object positioned at a rear side of a terminal body through a region occupied by the display unit 151 of the terminal body. This display unit 151 may be referred to as a transparent display unit 155.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output module 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 can include a multimedia module 181 which provides multimedia playback. The multimedia module 181 may be configured as part of the controller 180 or as a separate component. The controller 180 can perform a pattern recognition processing so as to recognize writing or drawing input on the touch screen as text or image.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination thereof. In some cases, such embodiments are implemented by the controller 180.

For a software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Hereinafter, a method of processing a user input with respect to the mobile terminal 100 will be described.

The user input unit 130 may be manipulated to allow inputting of commands for controlling operations of the mobile terminal 100, and include a plurality of first manipulation units 131, 132. The plurality of manipulation units 131, 132 may be referred to as a manipulating portion. Such manipulating portion can employ any tactile manner that a user can touch or tap for manipulation.

Various types of visual information may be displayed on the display unit 151. The information may be displayed in the form of character, number, symbol, graphic, icon, etc., or may be configured as a 3D stereoscopic image. In order to input such information, at least one of the characters, numbers, symbols, graphics and icons are displayed in a certain array so as to be implemented in the form of a keypad. Such keypad may be called 'soft key.'

The display unit 151 may be operated as a whole region or may be divided into a plurality of regions and accordingly operated. In the latter case, the plurality of regions may be operation in association with each other.

For example, an output window and an input window may be displayed at upper and lower portions of the display unit 151, respectively. The output window and the input window are regions allocated for outputting or inputting information, respectively. Soft keys including numbers for inputting a phone number, or the like, are output to the input window. When the soft key is touched, a number corresponding to the touched soft key is displayed on the output window. When the first manipulation unit is manipulated, a call connection with respect to a phone number displayed on the output window is attempted, or text displayed on the output window may be input to an application.

The display unit 151 or the touch pad may be configured to receive a touch through scrolling. The user may move a cursor or a pointer positioned on an entity, e.g., an icon, or the like, displayed on the display unit 151 by scrolling the display unit 151 or the touch pad. In addition, when the user moves his fingers on the display unit 151 or the touch pad, the path along which the user's fingers move may be visually displayed on the display unit 151. This would be useful in editing an image displayed on the display unit 151.

One function of the terminal may be executed in case where the display unit 151 (touch screen) and the touch pad are touched together within a certain time range. The both touches may be clamping the terminal body with the user's thumb and index finger. The executed one function of the mobile terminal 100 may be, for example, activation or deactivation of the display unit 151 or the touch pad.

Figure 2A:
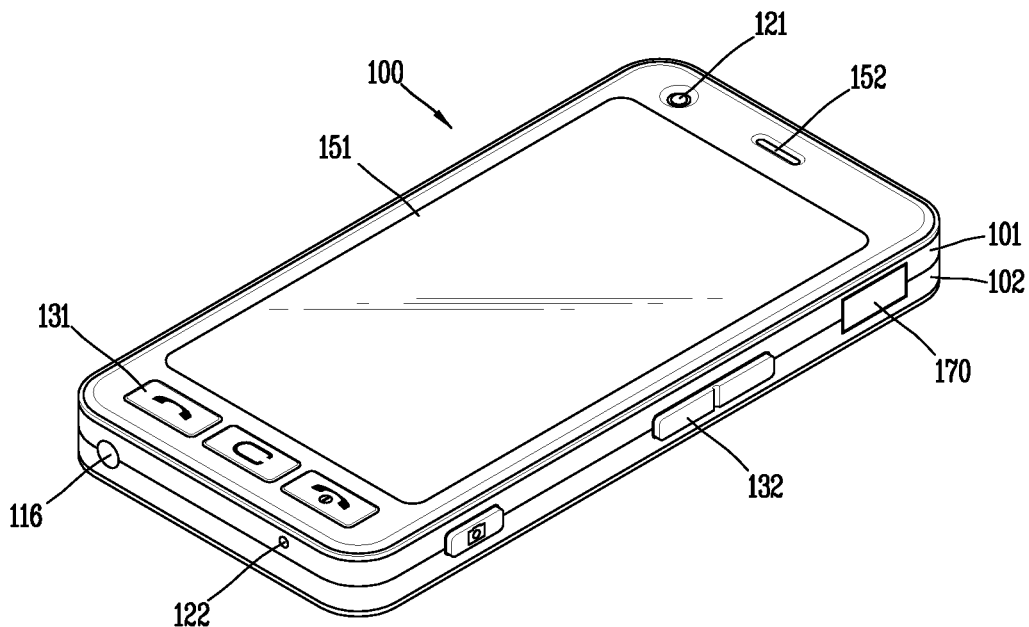
FIGS. 2A and 2B are perspective views showing an appearance of a mobile terminal in accordance with an embodiment of the present invention.
Figure 2B:
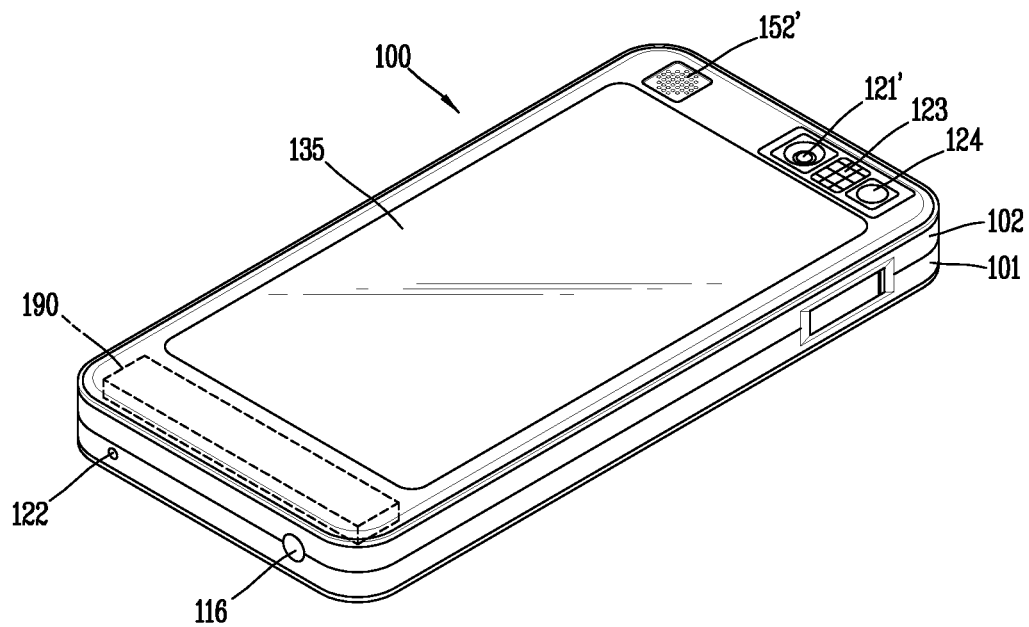

FIGS. 2A and 2B are perspective views showing an appearance of the mobile terminal in accordance with the one embodiment of the present invention. FIG. 2A shows a front surface and one side surface of the mobile terminal 100, and FIG. 2B shows a rear surface and another side surface of the mobile terminal 100.

Referring to FIG. 2A, the mobile terminal 100 disclosed herein is provided with a bar-type terminal body. However, the present application is not limited to this type of terminal, but is also applicable to various structures of terminals such as slide type, folder type, swivel type, swing type, and the like, in which two or more bodies are combined with each other in a relatively movable manner.

A terminal body may include a case (or referred to as casing, housing, cover, etc.) defining an appearance of the mobile terminal 100. In this embodiment of the present invention, the case is divided into a front case 101 and a rear case 102. Various electronic components are installed in the space between the front case 101 and the rear case 102. At least one intermediate case may be additionally disposed between the front case 101 and the rear case 102.

Such cases may be injected using a synthetic resin or be formed of a metal, such as stainless steel (STS), titanium (Ti), aluminum (Al) or the like.

The terminal body, usually the front case 101 may be shown having a display unit 151, an audio output module 152, a user input unit 130 (see FIG. 1), a microphone 122, an interface unit 170 and the like.

The display unit 151 may occupy most of a principal surface of the front case 101. The audio output module 152 and the camera 121 may be disposed near one of both end portions of the display unit 151, and a first user input unit 131 and the microphone 122 on the other end portion of the display unit 151. A second user input unit 132, the interface unit 170 and the like may be disposed on side surfaces of the front and rear cases 101 and 102.

The user input unit 130 may be manipulated to allow inputting of commands for controlling operations of the mobile terminal 100, and include a plurality of manipulation units 131 and 132.

The first and second manipulation units 131 and 132 may be set to allow inputting of various contents. For example, the first manipulation unit 131 may be configured to input commands such as START, END, SCROLL or the like, and the second manipulation unit 132 may be configured to input commands, such as a volume adjustment of sounds output from the audio output module 152, conversion of the display unit 151 into a touch recognition mode, or the like.

Referring to FIG. 2B, the rear surface, namely, the rear case 102 of the terminal body may further be provided with a rear camera 121'. The rear camera 121' faces a direction which is opposite to a direction faced by the front camera 121 (see FIG. 2A), and may have different pixels from those of the front camera 121.

For example, the front camera 121 may operate with relatively lower pixels (lower resolution) and the rear camera 121' may operate with relatively higher pixels. Thus, the front camera 121 may be useful when a user can capture his face and send it to another party during a video call or the like. This may result in reduction of a size of the transmitted data. On the other hand, the rear camera 121' may be useful for a user to obtain higher quality pictures for later use.

The cameras 121 and 121' may be installed in the terminal body to be rotatable or popped up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

A rear audio output module 152' may further be disposed at a rear face of the terminal body, namely, the rear case 102. The rear audio output module 152' can cooperate with the front audio output module 152 (see FIG. 2A) to provide stereo output. Also, the rear audio output module 152' may be configured to operate as a speakerphone.

A broadcast signal receiving antenna 116 may further be disposed at the side surface of the terminal body, in addition to an antenna for call connection. The antenna forming a part of the broadcast receiving module 111 may be retractably into the terminal body.

A power supply unit 190 for supplying power to the mobile terminal 100 may be mounted in the terminal body. The power supply unit 190 may be mounted in the terminal body or detachably coupled directly onto the outside of the terminal body.

The rear case 102 may be further provided with a touchpad 135 for detecting a touch input. Similar to the display unit 151 (see FIG. 2A), the touchpad 135 may be implemented as a light-transmissive type. A rear display unit may further be mounted on the touchpad 135 to output visual information even on the touchpad 135. Here, the information output on the front display unit 151 and the rear display unit may be controlled by the touchpad 135.

The touchpad 135 may operate mutually in association with the display unit 151. The touchpad 135 may be provided on the rear of the display unit 151 in parallel to each other. The touchpad 135 may have a size the same as or smaller than the size of the display unit 151.

In accordance with the present invention, when a touch is sensed in a lock state that an input of a control command is restricted, the controller 180 of the mobile terminal 100 may control the display unit 151 to output a home screen corresponding to at least one of a plurality of pages. Hereinafter, description will be given of a control method of outputting a home screen in response to a user's touch input in a lock state of the mobile terminal 100.

Figure 3:
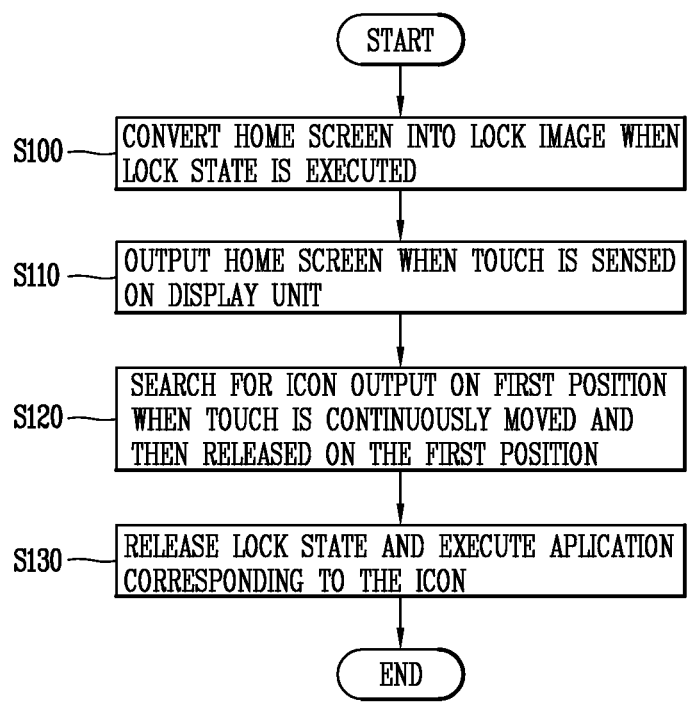
FIG. 3 is a flowchart showing a method of controlling a mobile terminal in accordance with one embodiment of the present invention.

Next, FIG. 3 is a flowchart showing a method of controlling a mobile terminal in accordance with one embodiment of the present invention. As shown in FIG. 3, the method includes converting a home screen into a lock image when a lock state is executed (S100).

In addition, the home screen refers to a main screen (or an idle screen) which is output on the display unit 151 when a user input applied onto a home button is sensed. For example, the home button may be physically formed on the main body of the mobile terminal 100 or output as an icon on the display unit 151.

The home screen may also include at least one page. Also, at least one icon corresponding to an application may be arranged on the page. A user can execute at least one operation of addition, deletion and edition of a page on the home screen. The user can also add, delete and edit icons arranged on each page.

Information related to the home screen can also be stored in the memory 160, and the controller 180 can output the home screen on the display unit 151 using the information stored in the memory 160. While the home screen is displayed, a lock state of the mobile terminal 100 can be executed according to a user's control or a lock state execution setting.

For example, when a user presses or touches the user input unit 130, which controls the conversion into the lock state, while the home screen is displayed, the mobile terminal 100 is converted into the lock state. The lock state refers to a state of restricting a control command from being input in response to a touch.

As another example, when a touch input is not applied onto the display unit 151 for a preset time, the controller 180 can convert the mobile terminal 100 into the lock state. This prevents an expected touch input in the active state of the display unit 151.

Upon the execution of the lock state, the display unit 151 may be converted into a deactivated (inactive) state. The "deactivated state" of the display unit 151 may indicate that a light (lamp) mounted in the mobile terminal for emitting light onto the display unit 151 has been turned off. That is, in the deactivated state, any information or graphic image may not be displayed on the display unit 151.

The controller 180 can then activate the display unit 151 which was in the deactivated state and output a lock image on the display unit 151. For example, when a user presses or touches the user input unit 130 in the deactivated state of the display unit 151, the display unit 151 may be activated. That is, the internal light or lamp for emitting light onto the display unit 151 may be turned on.

As the display unit 151 is activated in the lock state of the mobile terminal 100, the controller 180 can control the display unit 151 to output a lock image. Here, the lock image indicates an image which is provided to block or restrict an exposure of a specific screen (for example, a home screen, an application execution screen, etc.) or other images.

The lock image may include information text and shortcut icons. Each of the shortcut icons may include a URI, a GUID or a file name of a matched program. Also, under the control of the controller 180, the lock image may be output on the display unit 151 for a short time and then disappear. That is, when a user input has not been sensed for a predetermined time, the controller 180 can convert the display unit 151 from the activated state into the deactivated state.

Afterwards, when a touch input applied onto the display unit 151 is sensed, a home screen may be output on the display unit 151 (S110). When the display unit 151 is converted into the activated state in the lock state of the mobile terminal 100, the controller 180 can sense the touch input on the display unit 151. Here, the controller 180 can control the display unit 151 to display the home screen converted from the lock image based on the sensed touch input.

For example, the controller 180 can output the home screen, other than the lock image, on the display unit 151. As another example, the controller 180 can control the display unit 151 to display the home screen as if the home screen is placed under the lock image, by adjusting a transparency of the lock image.

As another example, the controller 180 can control the display unit 151 to display at least part of the home screen by converting one region of the lock image into the at least part of the home screen in response to a touch input. That is, the display unit 151 can display partial information related to the home screen, instead of the lock image, on one area which extends by a preset range, which includes a point where the user's touch input is sensed.

Next, when a touch input is continuously moved to a first position and released on the first position, an icon which is output on the first position is searched (S120).

In the lock state of the mobile terminal 100, a touch input sensed on the display unit 151 can be moved continuously without being released. Therefore, the controller 180 can track the touch input from a point where the touch is initially sensed to a point where the touch is released.

Upon the touch sensed, the home screen can be output on the display unit 151. The home screen may include at least one page, and each page may include at least one icon. Therefore, the at least one icon may be output on the display unit 151.

In general, icons may be arranged on the home screen in rows and columns without overlapping each other. Therefore, positions where the icons are output may be calculated using a coordinates system and the like.

Therefore, when the touch input is released on the first position, the controller 180 can search for an icon which is output on the first position. That is, the controller 180 can search for one icon of a plurality of icons which are output by being included in the home screen.

Next, the lock state is released and an application corresponding to the searched icon is executed (S130). An application or an application program refers to all software executed in an operating system. The application may include icons associated with the execution.

Further, the controller 180 can search for an icon which is output on the first position where the touch has been released, and execute an application corresponding to the searched icon. In response to the execution of the application, the controller 180 can output an execution screen for the application, instead of the home screen or the lock image.

In accordance with one embodiment of the present invention, when a touch input is sensed in a lock state of the mobile terminal, a home screen is output. When the touch input is continuously moved to be released on a position where an icon is output, the lock state is released and an application corresponding to the icon is executed. That is, a user can release the lock state and execute one of a plurality of applications installed in the mobile terminal by using one touch input. This provides the user with more convenient user interfaces (UIs).

Figure 4:
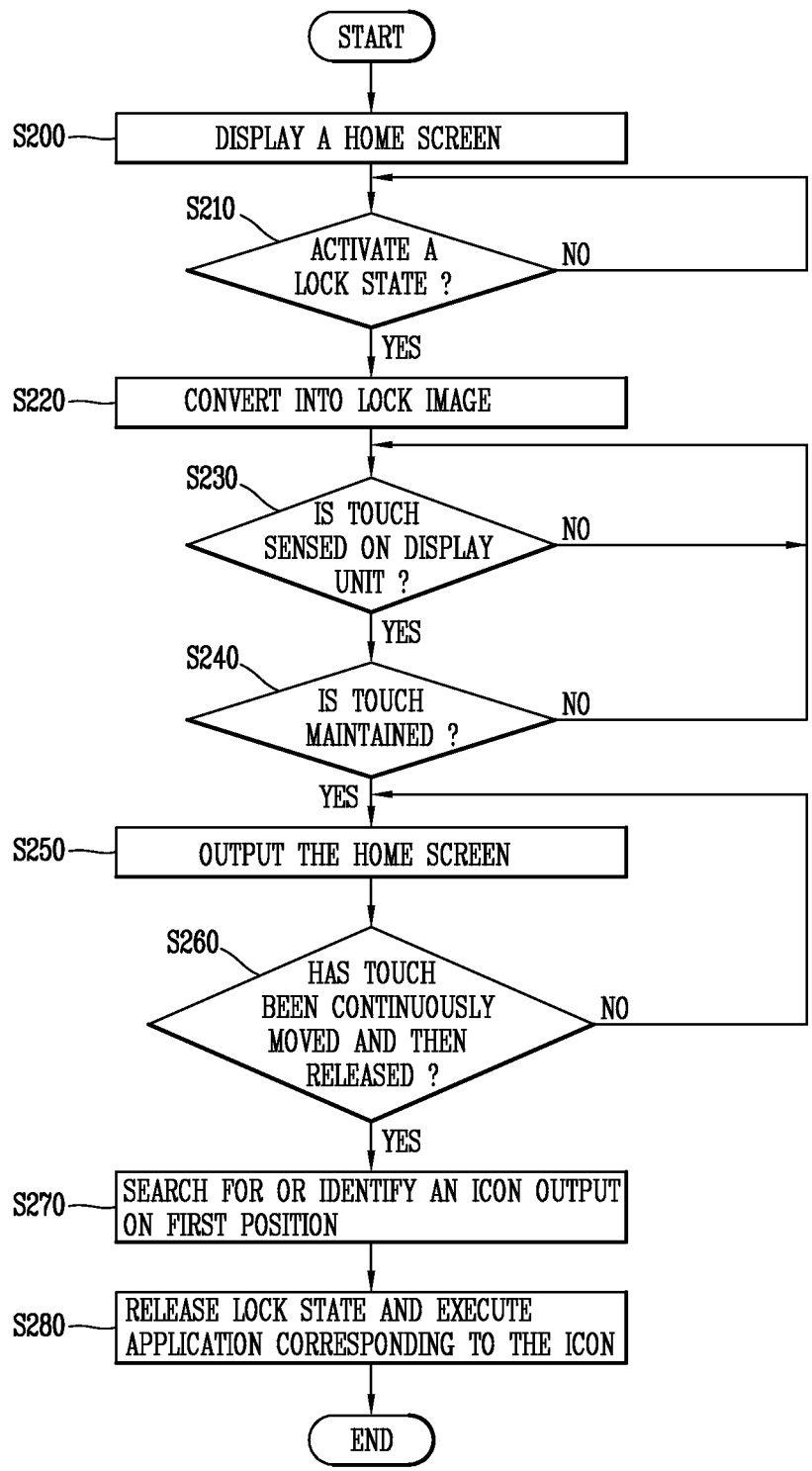
FIG. 4 is a flowchart showing in detail the control method for the mobile terminal shown in FIG. 3.

Next, FIG. 4 is a flowchart showing in detail the control method for the mobile terminal shown in FIG. 3. As shown in FIG. 4, the control method includes displaying a home screen (S200), and checking whether or not to activate a lock state (S210). As discussed above, the lock state refers to a state for preventing an unexpected input from being applied onto the mobile terminal 100. For example, when a user input is applied onto a lock button or a user input applied onto the user input unit 130 is not sensed for a preset time, the controller 180 can execute the lock state.

The method further includes converting the home screen into a lock image (S220). The lock image is output on the display unit 151 when the display unit 151 is activated in the lock state. Afterwards, whether or not a touch applied onto the display unit 151 is sensed (S230) and whether or not the touch is maintained (S240) are sequentially executed.

That is, the controller 180 can determine whether or not the touch sensed on the display unit 151 is maintained for a preset time. The preset time may be a time as short as the user being unable to recognize or a time long enough for the user to recognize for several seconds. This is to filter touch inputs applied irrespective of the user's intension.

The method also includes outputting the home screen (S250). The home screen may be output on the display unit 151 while the touch is maintained without being released. Next, the method includes determining whether or not the touch is continuously moved and then released (S260).

When the touch is not released (No in S260), the controller 180 goes back to the step (S250) of outputting the home screen. When the touch is released (Yes in S260), the controller 180 can calculate a first position where the touch was released and search for or identify an icon which is output on the first position (S270).

When the icon output on the first position was identified, an application corresponding to the icon is executed after releasing the lock state (S280). Further, when any icon is not present on the first position, the controller 180 can release the lock state or convert the home screen into the lock image (S220).

Figure 5A:
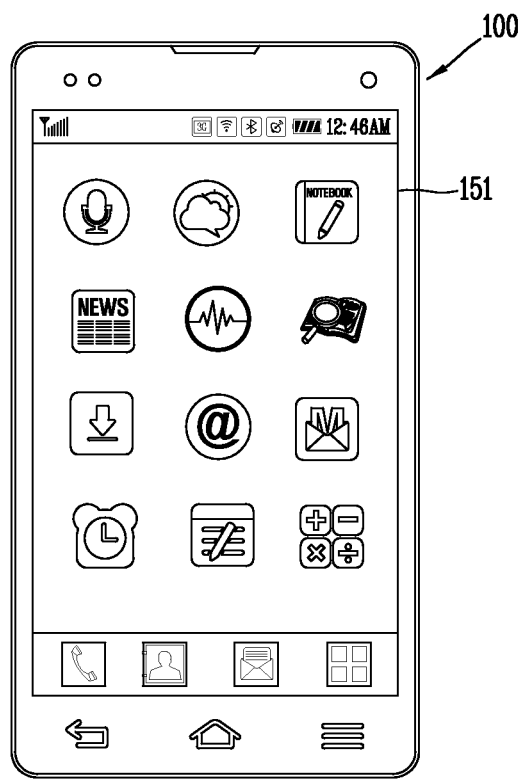
FIGS. 5A, 5B, 5C, 6A, and 6B are conceptual views showing the control method of FIG. 3.
Figure 5B:
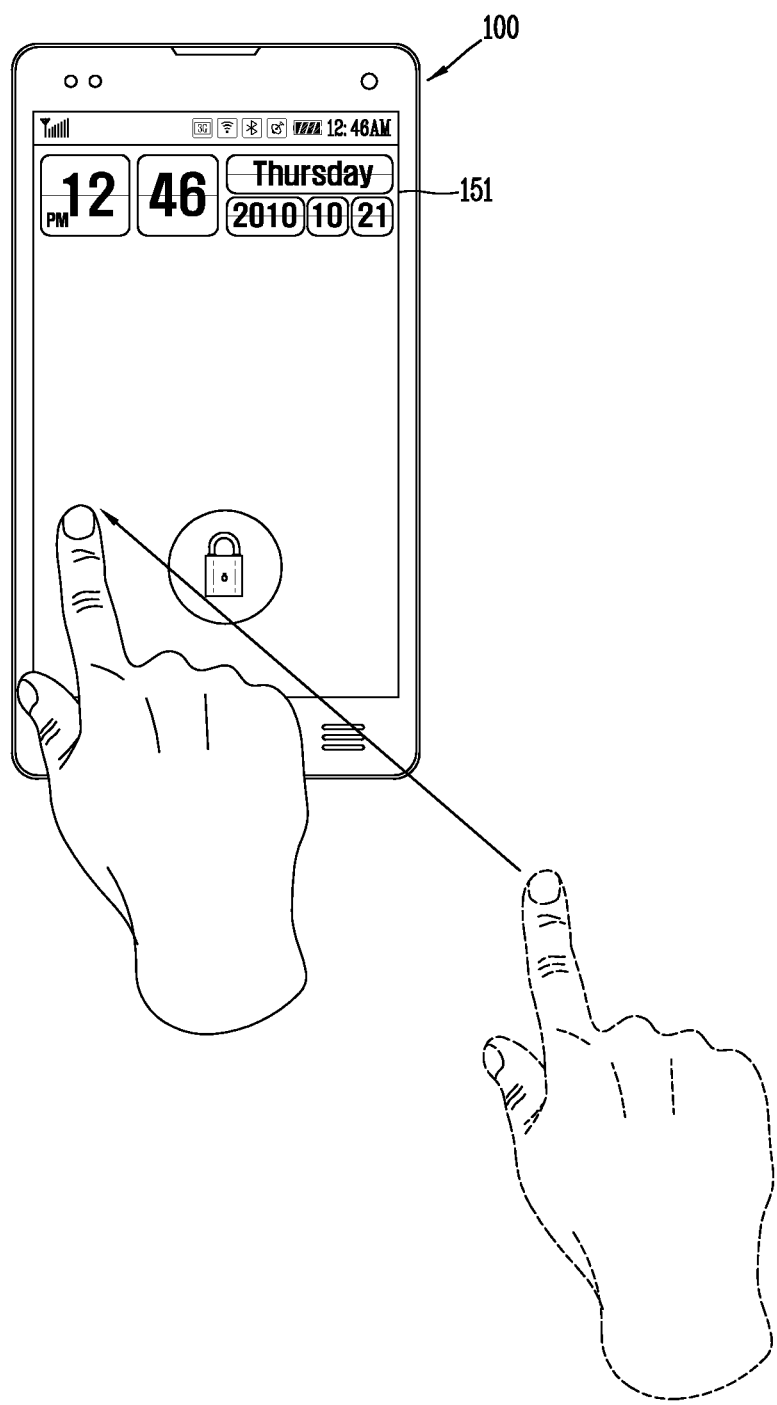
Figure 5C:
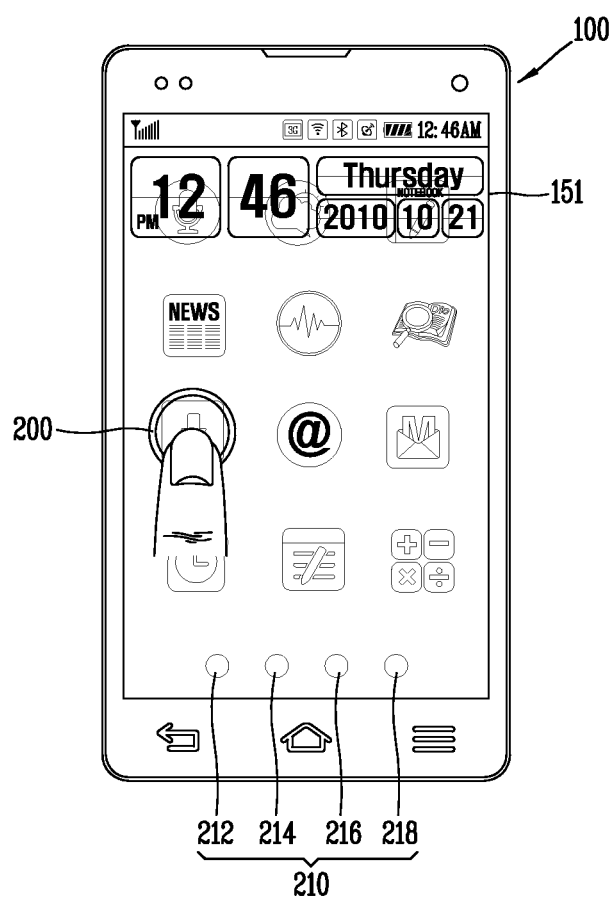
Figure 6A:
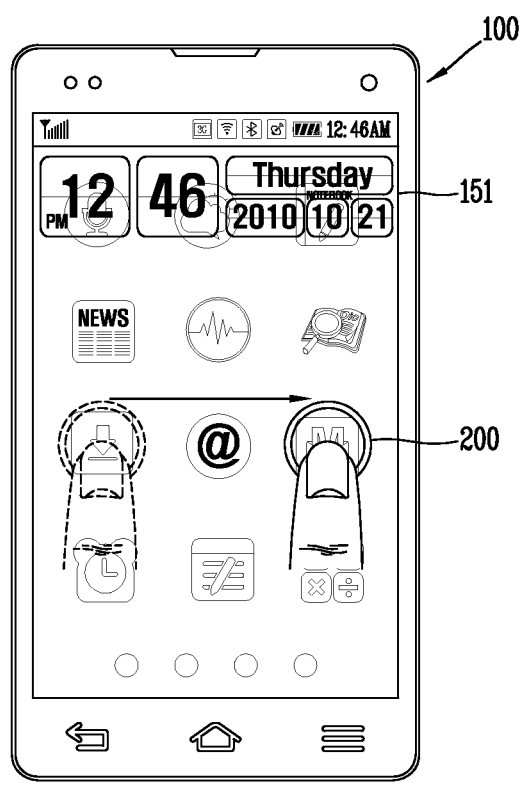
Figure 6B:
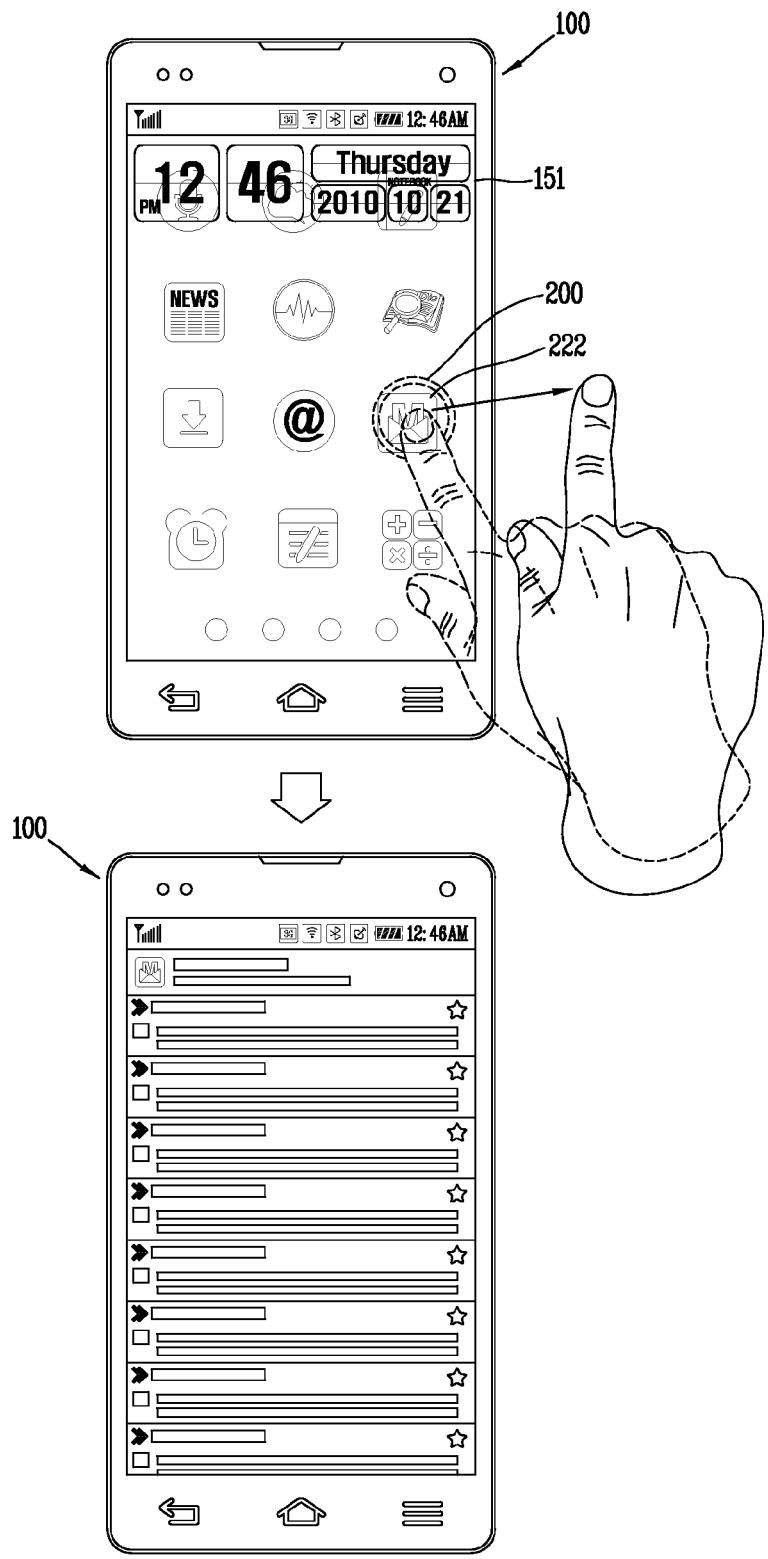

Next, FIGS. 5 and 6 are conceptual views showing the control method of FIG. 3. Especially, FIGS. 5A to 5C show that a touch is sensed on the display unit 151 in a lock state and the home screen is being output in response to the touch in the mobile terminal 100. Also, FIGS. 6A and 6B show that the touch is continuously moved to be released on a first position and an application corresponding to an icon output on the first position is executed in the mobile terminal 100.

In more detail, and referring to FIG. 5A, the mobile terminal 100 outputs a home screen including at least one page on the display unit 151. The home screen may include icons associated with an execution of applications. Further, when the home screen includes a plurality of pages, the plurality of pages may include different icons, respectively. Here, a page output on the display unit 151 may be shifted in response to a drag input.

When a lock state is activated, the mobile terminal 100 converts the home screen into a lock image. The controller 180 can control the lock image to disappear from the display unit 151 after being displayed on the display unit 151 for a short time.

FIG. 5B shows that the display unit 151 has been activated in the mobile terminal 100. Because the display unit 151 is in the activated state, the controller 180 outputs the lock image. The lock image may be an image preset in the memory 160, and implemented as various forms such as picture, moving image, pattern and the like.

In the activated state of the display unit 151, the controller 180 can sense a touch input applied onto the display unit 151. That is, the touch applied onto the display unit 151 may refer to a contact generated by a finger, a stylus pen or other touching tools.

When a touch is sensed on the display unit 151, the controller 180 outputs a home screen. For example, as shown in FIG. 5C, the controller 180 can adjust a transparency of the lock image. With the adjustment of the transparency, an effect as if the home screen is placed under the lock image may be generated.

Accordingly, the controller 180 can output the lock image and the home screen in an overlapping manner. As another example, the home screen may be output instead of the lock image or a partial area of the lock image may be converted into the home screen.

Also, the controller 180 can output a graphic object, which indicates a position where a touch is sensed, on the display unit 151 in response to the touch. FIG. 5C shows the mobile terminal outputting a graphic object 200 in a circular shape formed centering around the touch-sensed point.

The graphic object 200 may be formed in, but not limited to, a circular shape extending by the same length based on the touched point. That is, the graphic object 200 may be formed in various shapes, such as triangle, square, star-like shape, a bubble shape, contours of a human body, a mouse pointer, an arrow and the like.

The graphic object 200 is provided for improvement of user's intuition and convenience. The graphic object 200 can also not be output. That is, outputting the graphic object 200 corresponds to one embodiment of the present invention of the present invention.

The controller 180 can output respective shortcut icons 212 to 218 for a plurality of pages on the display unit 151, together with the home screen, when the home screen includes a plurality of pages.

Here, the shortcut icon may refer to an icon which allows for rapidly outputting one of the plurality of pages included in the home screen. For example, referring to FIG. 5C, the home screen may include four pages, and the shortcut icons 212, 214, 216 and 218 may be output on the display unit 151. The shortcut icon will be described later with reference to FIG. 8.

Prior to explaining FIG. 8, an example that a touch is continuously moved and then released while the home screen is output will be described with reference to FIGS. 6A and 6B.

Referring to FIG. 6A, the mobile terminal 100 outputs the home screen in response to a touch in a lock state thereof. Here, the touch is continuously moved (dragged, etc.), without being released, on the display unit 151.

The controller 180 can sense and track the movement (dragging, etc.) of the touch. As the touch is continuously moved, the controller 180 can shift the position of the graphic object 200 responsive to the touch input.

When the touch is released without being continuously moved from the sensed position, the controller 180 can convert the home screen into a lock image. Similarly, when the touch is sensed for a shorter time than a preset time, the controller 180 can convert the home screen into the lock image. The preset time may refer to a time as short as the user being unable to recognize. This is to prevent the mobile terminal 100 from operating due to a user-unexpected touch.

Referring to FIG. 6B, the touch is continuously moved to a first position and released on the first position. Here, the controller 180 can identify an icon 222, which is output on the first position, from icons included in the home screen.

The icon 222 output on the first position, for example, may be an icon which is overlapped by the graphic object 200 on the greatest area thereof. As another example, the icon 222 may be an icon which is the closest to the first position.

When the icon 222 has been identified, the controller 180 can release the lock state of the mobile terminal 100, and execute an application corresponding to the icon 222. In response to the execution of the application, an execution screen of the application can be output on the display unit 151.

For example, referring to FIGS. 6A and 6B, the home screen is output in response to a touch input. The touch input is then continuously moved from an initial touch point to a first touch point and released on the first touch point. Because the icon 222 output on the first touch point is a mail-related application, the controller 180 can release the lock state and output an execution screen of the mail-related application on the display unit 151.

As described above, in accordance with an embodiment of the present invention, when a touch (input) is sensed in a lock state of a mobile terminal, a home screen is output. When the touch is continuously moved to a first position and released on the first position, an application corresponding to an icon which is located the closest to the first position is executed. Consequently, the lock state can be released and the application corresponding to a selected icon can be executed, in response to one touch input, thereby enhancing user convenience.

Figure 7A:
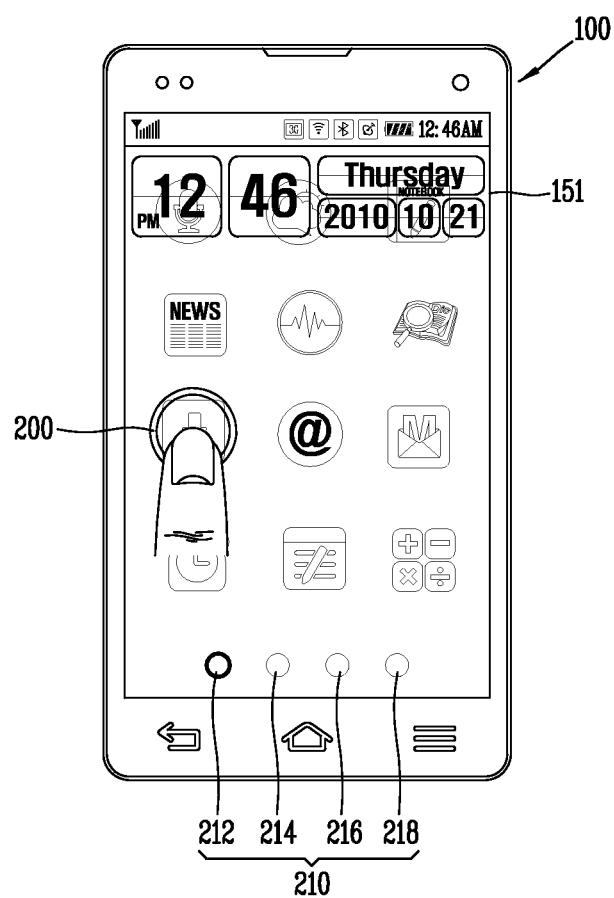
FIGS. 7A and 7B are conceptual views showing a mobile terminal which is outputting a home screen in accordance with one embodiment of the present invention.
Figure 7B:
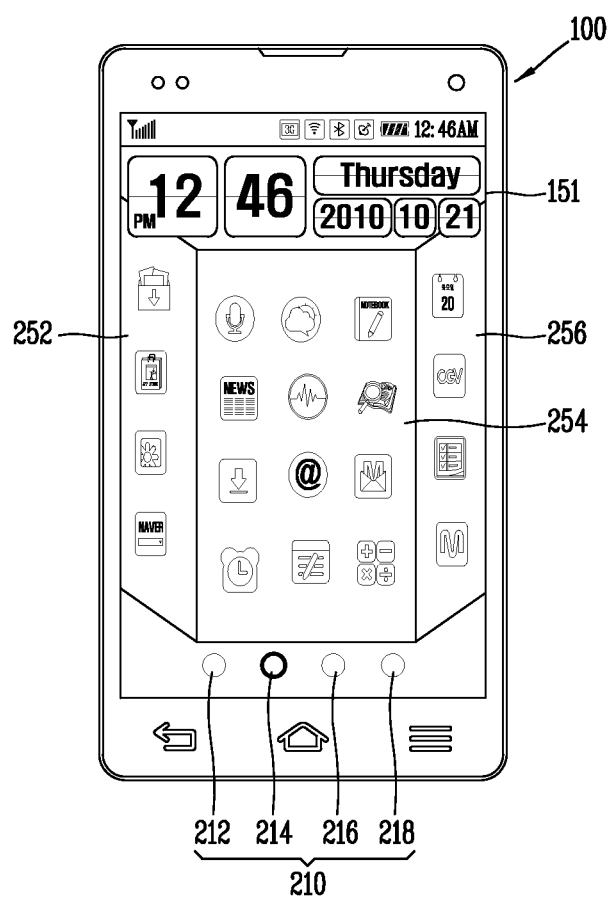

Next, FIGS. 7A and 7B are conceptual views showing a mobile terminal outputting a home screen in accordance with one embodiment of the present invention. It is assumed that mobile terminals shown in FIGS. 7A and 7B are outputting a home screen and a graphic object 200 corresponding to a touch after the touch is sensed in a lock state.

If the home screen includes a plurality of pages, the controller 180 can output at least one of the plurality of pages on the display unit 151 in response to the touch. For example, referring to FIG. 7A, the controller 180 can output a first page of the plurality of pages in response to the touch in the lock state of the mobile terminal 100. That is, one of the plurality of pages may be preset as a default page. Instead of the first page, a page which was output just before executing the lock state may be set as the default page.

As another example, referring to FIG. 7B, the controller 180 can output a plurality of pages on the display unit 151 in response to the touch in the lock state. With the plurality of pages being output, the user can see more icons at once.

Also, when the home screen includes the plurality of icons, the controller 180 can output the shortcut icons 212 to 218 together with the home screen. The controller 180 can output shortcut icons for all the pages included in the home screen or shortcut icons for at least part of the pages.

Here, the shortcut icon may correspond to a link for connecting or accessing one of the plurality of pages included in the home screen. For example, the first to fourth shortcut icons 212 to 218 may correspond to links for connecting first to fourth pages, respectively. The controller 180 can output the shortcut icons within a space of the home screen not to overlap at least part of the icons included in the home screen.

Also, a shortcut icon corresponding to a page, output on the display unit 151, of the plurality of pages may be output to be distinguished from the other shortcut icons. For example, referring to FIG. 7A, since the first page is output, the first shortcut icon 212 may be output to be distinguished from the other shortcut icons. As another example, referring to FIG. 7B, since first and third pages 252 and 256 are output on both sides with interposing a second page 254 therebetween, the second shortcut icon 214 may be output to be distinguished from the other shortcut icons.

Figure 8:
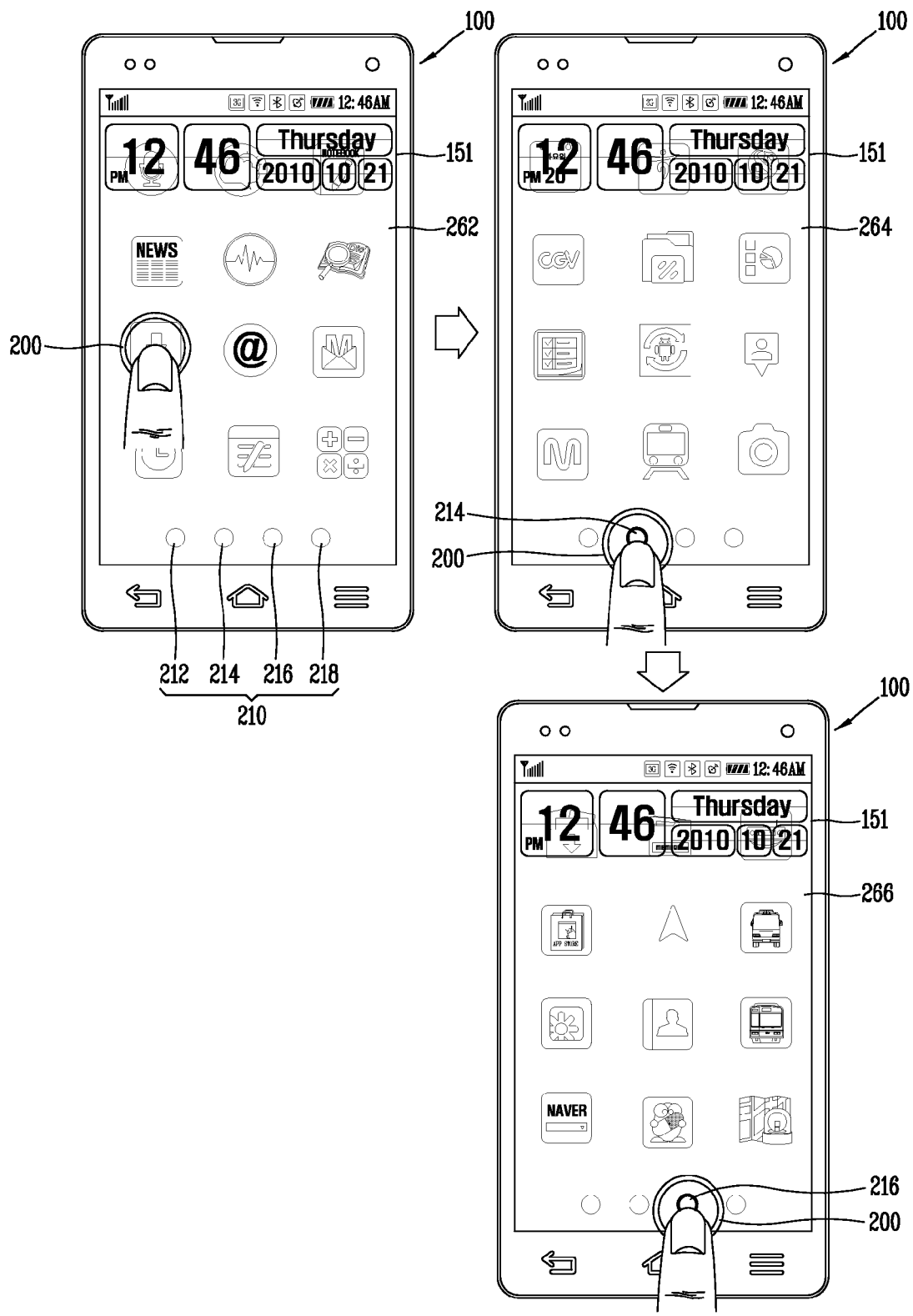
FIG. 8 is a conceptual view showing a mobile terminal displaying a home screen and shortcut icons for a plurality of pages in accordance with one embodiment of the present invention.

Next, FIG. 8 is a conceptual view showing a mobile terminal outputting a home screen and shortcut icons for a plurality of pages in accordance with one embodiment of the present invention. When a touch is sensed in a lock state of a mobile terminal, at least one page of a plurality of pages included in a home screen can be output on the display unit 151.

Referring to FIG. 8, a first page 262 of a plurality of pages is output on the display unit 151. Accordingly, a first shortcut icon 212 is output to be distinguished from the other shortcut icons. Also, a graphic image 200 corresponding to the touch may be output.

Here, the touch may be continuously moved without being released. If the touch is moved to a position where a second shortcut icon 214 is output, the controller 180 can output a second page 264 corresponding to the second shortcut icon 214, instead of the first page 262.

Similarly, when the touch is continuously moved to a position where a third shortcut icon 216 is output, the controller 180 can output a third page 266 corresponding to the third shortcut icon 216 on the display unit 151. A user can thus search for pages included in the home screen by moving a touch to a position where a shortcut icon is output without releasing the touch.

Figure 9:
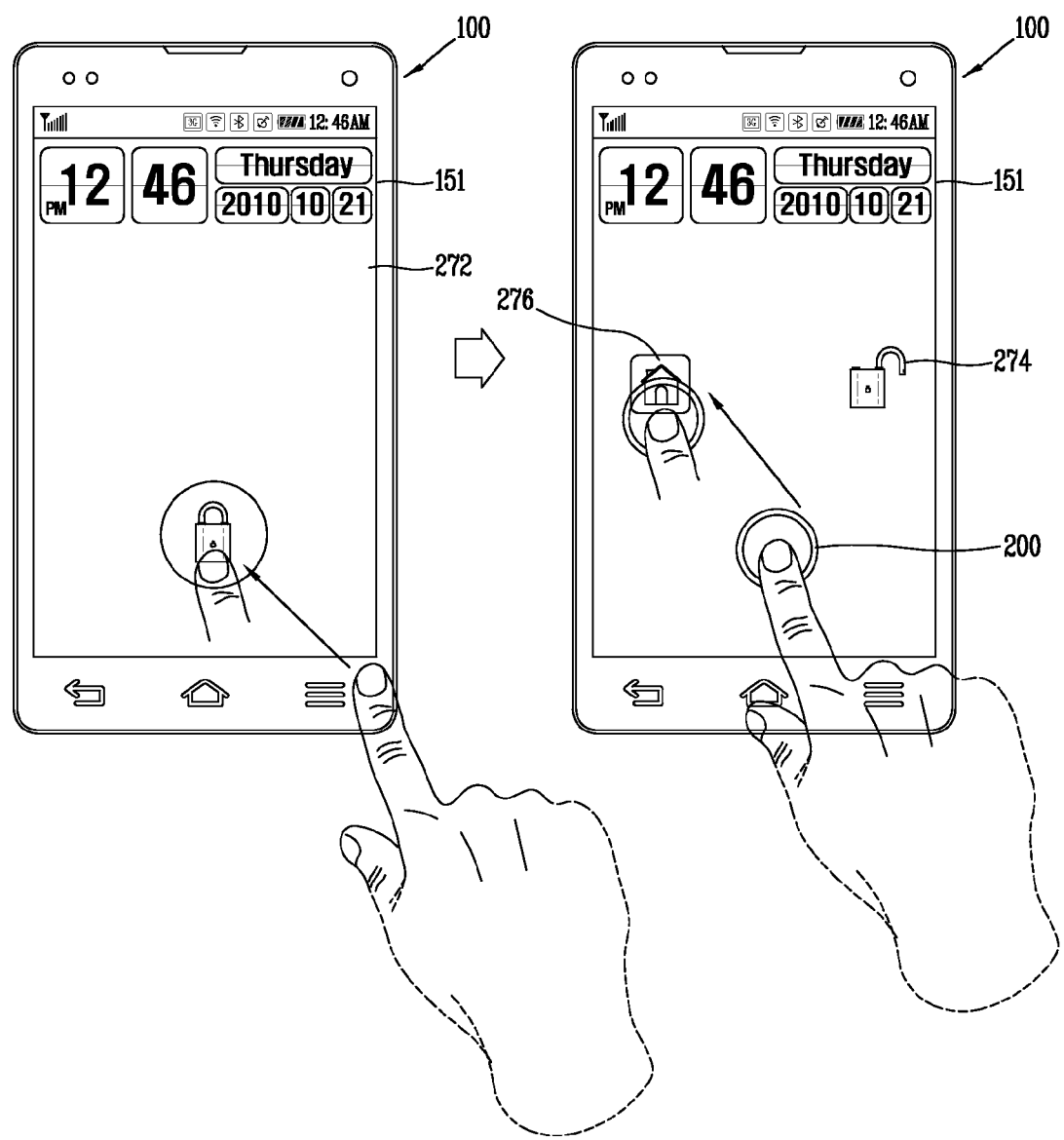
FIGS. 9 and 10 are conceptual views showing a mobile terminal displaying navigation icons in accordance with one embodiment of the present invention.
Figure 10:
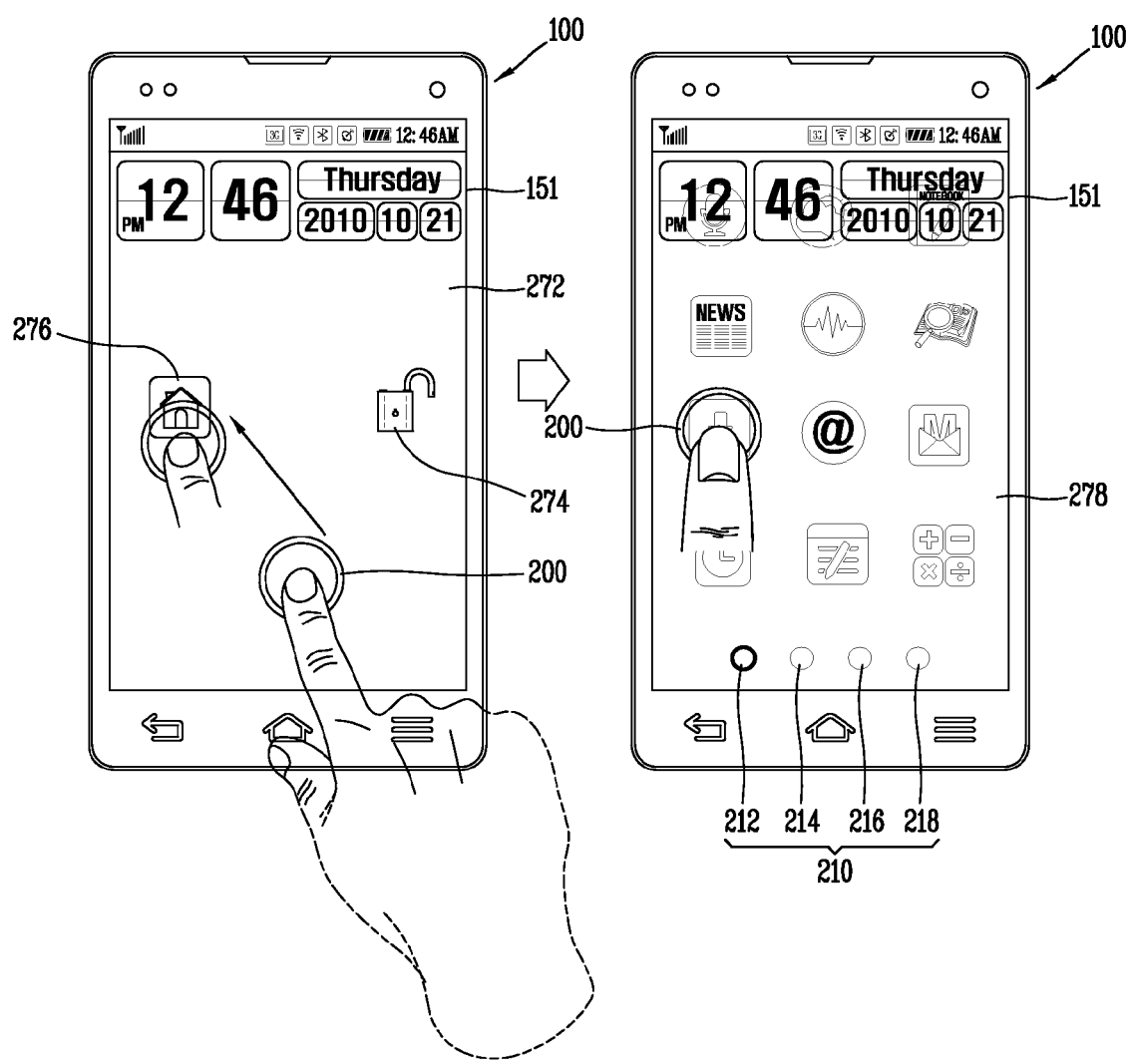

Next, FIGS. 9 and 10 are conceptual views showing a mobile terminal outputting navigation icons in accordance with one embodiment of the present invention. As shown in FIG. 9, the mobile terminal 100 includes the display unit 151 which outputs a lock image 272 according to a lock state. When the display unit 151 is activated in the lock state of the mobile terminal 100, the controller 180 can output the lock image 272. The controller 180 can also sense a user's touch input.

When the touch is sensed, the controller 180 can output an unlock icon 274 and a home output icon 276 together with the lock image. Also, in response to the touch, the controller 180 can output a graphic object 200 on the display unit 151. Here, the touch may be continuously moved without being released, and the graphic object 200 may accordingly be moved in response to the movement of the touch.

When the touch is released without being continuously moved to one of the unlock icon 274 or the home output icon 276, the controller 180 can maintain the lock state. When the touch is moved to the position where the unlock icon 274 is output, the controller 180 can release the lock state. In response to the release of the lock state, screen information which was output just before locking the screen may be output on the display unit 151.

When the touch is moved to the position where the home output icon 276 is output, the controller 180 can maintain the lock state. Here, only the home screen may be output on the display unit 151. For example, referring to FIG. 10, as the touch is continuously moved to the position where the home output icon 276 is output, the controller 180 can output a first page 278 of the home screen.

Afterwards, the touch may be continuously moved or released on the first position, and the embodiment of the present invention described with reference to FIGS. 6 to 8 can be applied.

Figure 11:
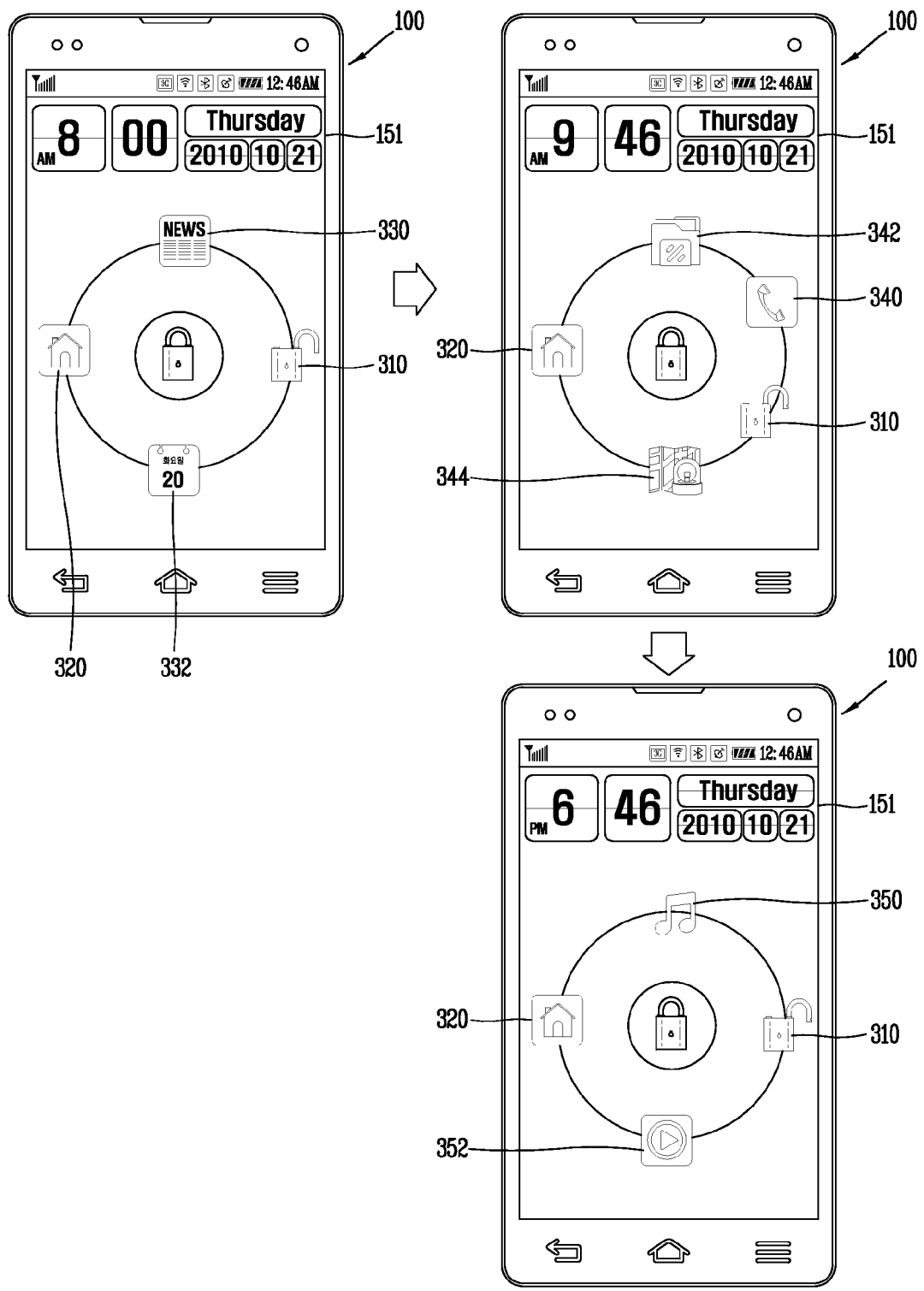
FIG. 11 is a conceptual view showing that navigation icons change on a time basis in a mobile terminal in accordance with one embodiment of the present invention.

Next, FIG. 11 is a conceptual view that navigation icons change on a time basis in a mobile terminal in accordance with one embodiment of the present invention. As shown in FIG. 11, the mobile terminal 100 includes the display unit 151 which outputs a lock image in response to an execution of a lock state.

When the display unit 151 is activated in the lock state of the mobile terminal 100, the controller 180 can output a lock image. The controller 180 can also sense a user's touch input. When the touch is sensed, the controller 180 outputs an unlock icon 310 and a home output icon 320 together with the lock image. The description of the unlock icon 310 and the home output screen 320 has been given with reference to FIG. 9, so detailed description thereof will be omitted.

Icons which are output together with the lock image in the lock state may be called 'navigation icons.' The navigation icons can be used to execute functions and thus provide a convenient interface to a user. In accordance with one embodiment of the present invention, the navigation icons include the unlock icon 310 and the home output icon 320.

Further, the controller 180 can change the navigation icons output on the display unit 151 according to a touch-sensed time in the lock state. That is, when the touch is sensed in the lock state, the controller 180 can calculate the touch-sensed time and change the navigation icons based on the calculated time.

For example, as shown in FIG. 11, since "8 o'clock in the morning (8:00 am)" is a time to get ready to go to work, the controller 180 can output an icon 330 corresponding to a news application and an icon 332 corresponding to a schedule application, as the navigation icons.

As another example, since "9:46 am" belongs to working hours, the controller 180 can output an icon 340 corresponding to a call application, an icon 342 corresponding to a file share application, and an icon 344 corresponding to a map application, as the navigation icons.

As another example, since "6:46 pm" is a time to finish work, the controller 180 can output icons 350 and 352 corresponding to music or multimedia applications, as the navigation icons. Further, the user can execute a specific application by inputting a touch onto the display unit 151 and moving the touch to a position where an icon corresponding to the specific application is output.

Information related to the navigation icons can also be stored in the memory 160. Here, the user can add, delete or edit the information related to the navigation icons, stored in the memory 160. For example, a new time slot may be set and navigation icons output in the new time slot may be added to the memory 160.

As another example, at least one of navigation icons included in a preset time slot may be deleted or a new icon may be added into the preset time slot. Here, the mobile terminal 100 can provide user interfaces by which the user can manage the navigation icons.

Figure 12:
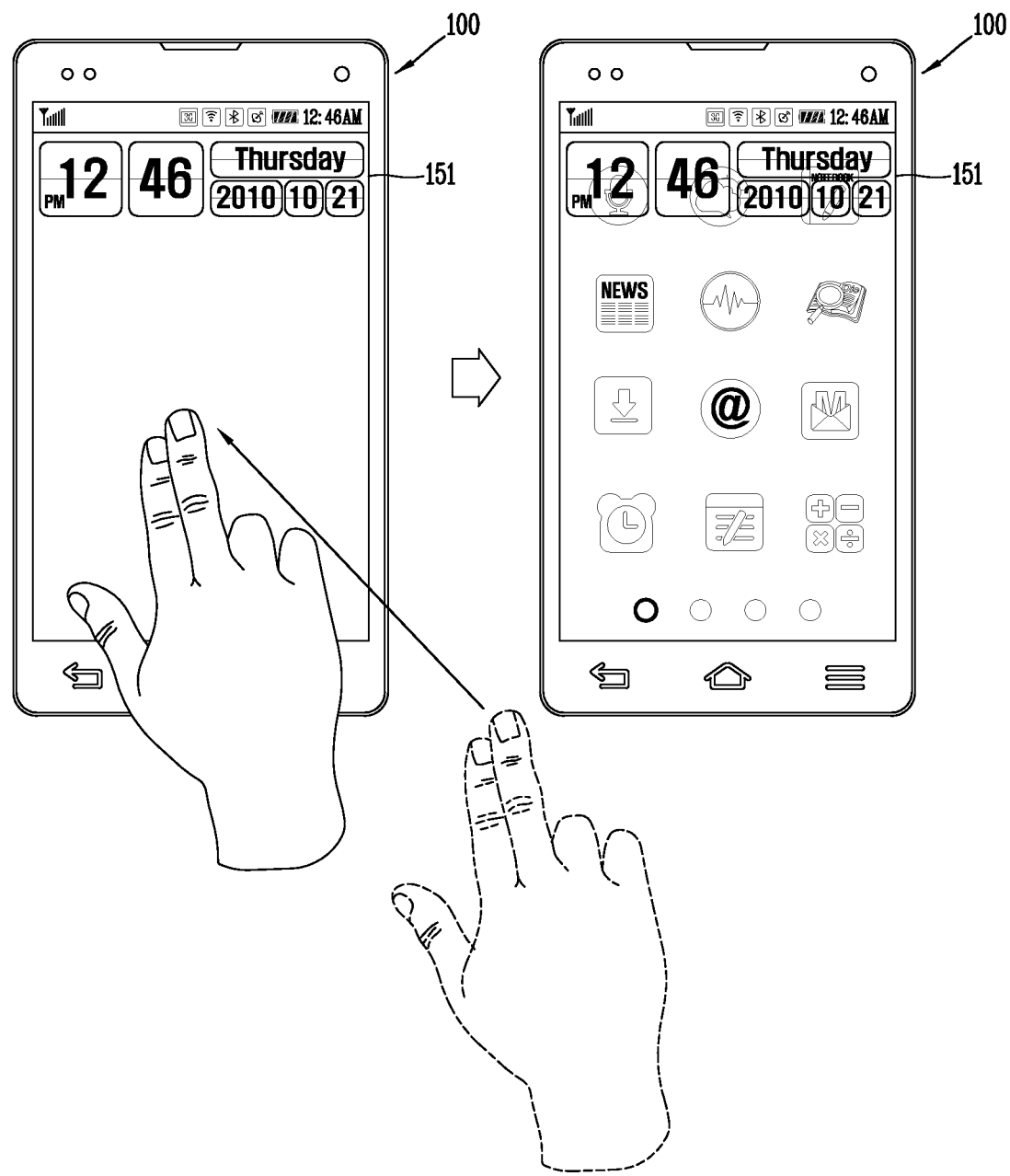
FIGS. 12 to 14 are conceptual views showing a control method for a mobile terminal using a multi-touch in accordance with one embodiment of the present invention.
Figure 13:
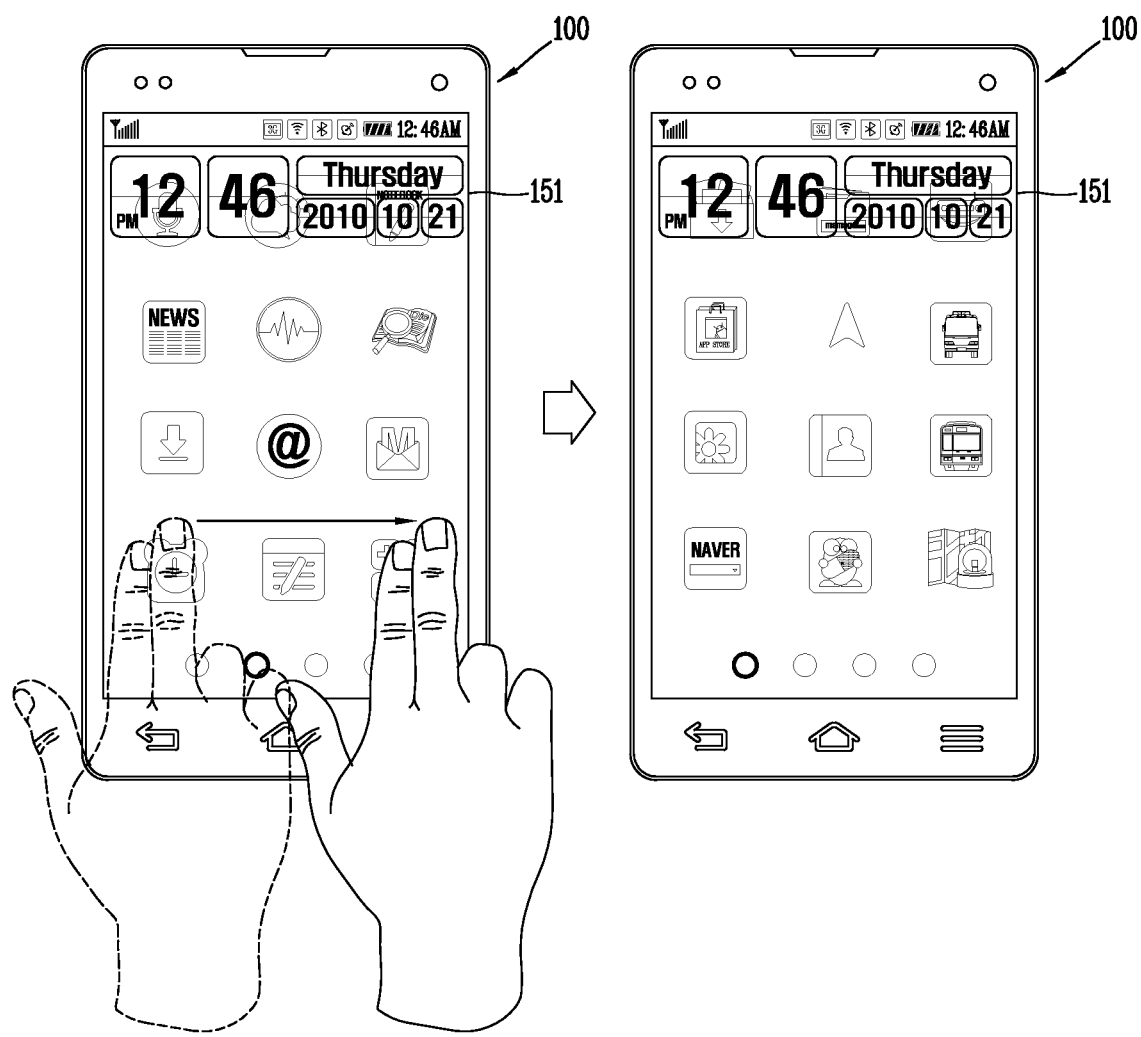
Figure 14:
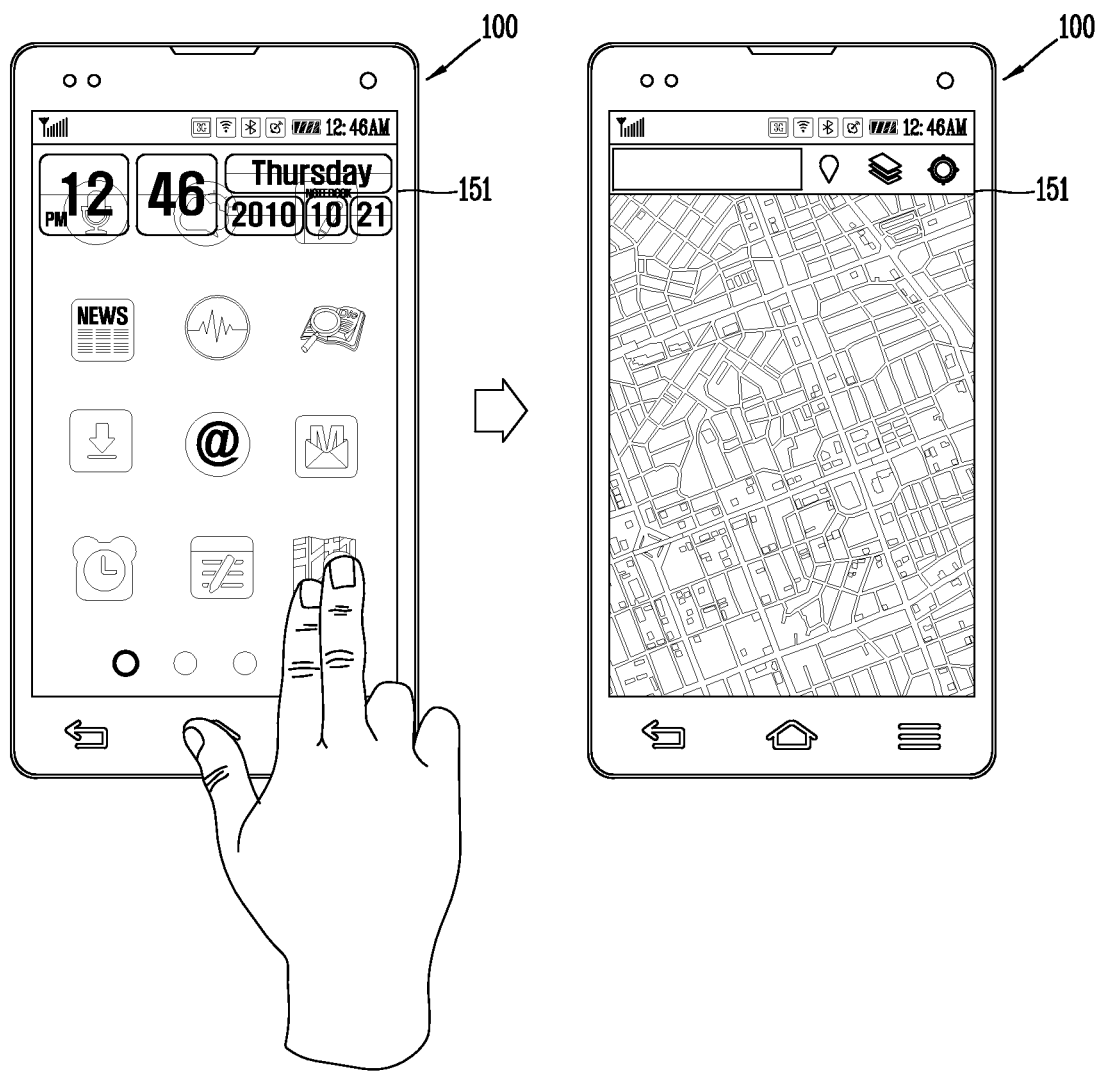

Next, FIGS. 12 to 14 are conceptual views showing a control method for a mobile terminal using a multi-touch in accordance with one embodiment of the present invention. As shown in FIG. 12, the mobile terminal 100 includes the display unit 151 which outputs a lock image in a lock state thereof. Further, navigation icons can be output together with the lock image.

Here, the controller 180 can sense a multi-touch. The multi-touch refers to a plurality of touch inputs being sensed within a predetermined area for a short time. For example, when first and second fingers contact the display unit 151 with being close to each other, the controller 180 can determine a multi-touch is being applied.

The predetermined area may be preset, for example, as a circle with a diameter of 3 cm in order to prevent generation of an error. The predetermined area may change variously according to experiments. Also, the short time may refer to a time shorter than 1 second including the same time.

When a multi-touch is sensed while a lock image is output, the controller 180 can output a home screen. Unlike the single touch described with reference to FIGS. 6 to 8, the controller 180 can output the home screen even though the multi-touch is released. The multi-touch preferably meets delicate conditions (a plurality of touches applied into a predetermined area within a short time) rather than the single touch. Therefore, the probability that an error occurs is lower.

Here, when the home screen is output in response to the multi-touch, the controller 180 can execute a control function only by the multi-touch. That is, the lock state of the mobile terminal 100 may be maintained when a single touch is applied. The controller 180 can ignore the single touch sensed on the display unit 151.

For example, referring to FIG. 13, after the home screen is output in response to the multi-touch and a new multi-touch may be sensed on the display unit 181. Here, the controller 180 can calculate a position where the new multi-touch is sensed and search for an icon output on the calculated position. When any icon is identified, the controller 180 can execute an application corresponding to the searched icon.

Also, when the home screen includes a plurality of pages, at least one of the plurality of pages can be output on the display unit 151 in the lock state of the mobile terminal 100. Here, shortcut icons corresponding to the plurality of pages, respectively, may be output together with the at least one page.

Here, a drag input applied by the multi-touch may be sensed. For example, referring to FIG. 14, a multi-touch can be sensed on a first position and continuously moved from the first position to a second position. In this instance, the controller 180 can convert a page output on the display unit 151 in response to the drag input by the multi-touch.

For example, when a multi-touch is dragged from left to right while a second page is output, the controller 180 can output a first page instead of the second page. That is, a previous page can be output when the multi-touch is dragged from left to right, while the following page may be output when the multi-touch is dragged from right to left. In other words, the page may be shifted according to the dragging direction of the multi-touch.

As described above, a lock state can be released and a specific application can be executed by giving one touch input, resulting in enhancement of user convenience in view of operating a mobile terminal. Also, with a home screen being viewed in the lock state, information relating to icons included in the home screen can be conveniently provided.

In addition, when the user touches the lock screen and drags the graphic object 200 to an icon to be executed, the mobile terminal can display a password login window first that the user can use to enter a password. Further, the mobile terminal can capture an image of the user's fingertip and use this image to determine if the proper user is trying to unlock the mobile terminal and execute an application. Alternatively, the touch and drag operation alone can be sufficient to unlock the terminal and execute the application (e.g., if a "swipe" gesture is set as the unlock screen function).

The present invention can also allow for releasing the lock state and executing the specific application using the one touch input, providing a faster and more simplified control method than the related art. Further, because navigation icons may change on a time basis, applications which are appropriately set for each time slot may be executable even without outputting the home screen.

In addition, touch inputs for releasing the lock state can be divided into a single touch input and a multi-touch input. This results in providing various unlocking methods.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiment of the present inventions described herein may be combined in various ways to obtain additional and/or alternative embodiment of the present inventions.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a wireless communication unit to wirelessly communicate with at least one other terminal;
   a display unit configured to display one of a plurality of home screens, wherein each home screen of the plurality of home screens includes a plurality of icons; and
   a controller configured to:
   control the display unit to convert the one home screen into a lock screen when a lock state for restricting an input of a control command is executed,
   receive a first touch on the lock screen,
   display, on the display unit in the lock state, the one home screen together with shortcut icons for displaying a corresponding home screen of the plurality of home screens when the first touch satisfies a predetermined condition,
   sense a second touch starting from the first touch and continuously moving to a position where any one of the shortcut icons is displayed,
   display, on the display unit in the lock state, another home screen corresponding to the any one of the shortcut icons together with the shortcut icons in response to the sensed second touch, wherein the shortcut icons are displayed within a space of the another home screen not to overlap at least part of icons included in the another home screen,
   sense a third touch starting from the second touch and continuously moving to a first position,
   identify an icon displayed at the first position on the another home screen among a plurality of icons included in the another home screen, and
   release the lock state and execute an application corresponding to the identified icon when the third touch is released.

2. The mobile terminal of claim 1, wherein a shortcut icon corresponding to the another home screen is displayed to be distinguished from the other shortcut icons while the another home screen is displayed in the lock state.

3. The mobile terminal of claim 1,
   wherein the controller is further configured to selectively perform a first operation or a second operation based on whether or not any one of the plurality of icons is displayed at the first position when the third touch is released at the first position,
   wherein according to the first operation, the controller is further configured to release the lock state and execute an application corresponding to the any one of the plurality of icons when the any one of the plurality of icons is displayed at the first position, and
   wherein according to the second operation, the controller is further configured to maintain the lock state and display the lock screen instead of the another home screen when any icon is not present on the first position.

4. The mobile terminal of claim 1, wherein the controller is further configured to adjust a transparency of the lock screen such that the lock screen and any one of the home screens are displayed in an overlapping manner.

5. The mobile terminal of claim 1, wherein the controller is further configured to display a graphic object on the display unit corresponding to a position where the first touch is first touched on the display unit.

6. The mobile terminal of claim 1, wherein the controller is further configured to shift a position of the graphic object in response to the first touch being continuously moved.

7. The mobile terminal of claim 1, wherein the controller is further configured to unlock the mobile terminal and display a home screen corresponding to a respective shortcut icon when the third touch is released on the respective shortcut icon.

8. A method of controlling a mobile terminal, the method comprising:
   allowing, via a wireless communication unit, wireless communication with at least one other terminal;
   displaying any one of a plurality of home screens on a display unit, wherein each home screen of the plurality of home screens includes a plurality of icons;

converting the one home screen into a lock screen when a lock state for restricting an input of a control command is executed;

receiving a first touch on the lock screen;

displaying, on the display unit in the lock state, the one home screen together with shortcut icons for displaying a corresponding home screen of the plurality of home screens when the first touch satisfies a predetermined condition;

sensing a second touch starting from the first touch and continuously moving to a position where any one of the shortcut icons is displayed;

displaying, on the display unit in the lock state, another home screen corresponding to the any one of the shortcut icons together with the shortcut icons in response to the sensed second touch, wherein the shortcut icons are displayed within a space of the another home screen not to overlap at least part of icons included in the another home screen;

sensing a third touch starting from the second touch and continuously moving to a first position;

identifying an icon displayed at the first position on the another home screen among a plurality of icons included in the another home screen; and releasing the lock state and executing an application corresponding to the identified icon when the third touch is released.

9. The method of claim 8, wherein a shortcut icon corresponding to the another home screen is displayed to be distinguished from the other shortcut icons while the another home screen is displayed in the lock state.

10. The method of claim 8, further comprising:

selectively performing a first operation or a second operation based on whether or not any one of the plurality of icons is displayed at the first position when the third touch is released at the first position, wherein according to the first operation, releasing the lock state and executing an application corresponding to the any one of the plurality of icons when the any one of the plurality of icons is displayed at the first position, and wherein according to the second operation, maintaining the lock state and displaying the lock screen instead of the another home screen when any icon is not present on the first position.

11. The method of claim 8, further comprising:

displaying a graphic object on the display unit corresponding to a position where the first touch is first touched on the display unit.

12. The method of claim 11, further comprising:

shifting a position of the graphic object in response to the first touch being continuously moved.

13. The method of claim 8, further comprising:

unlocking the mobile terminal and displaying a home screen corresponding to a respective shortcut icon when the third touch is released on the respective shortcut icon.

* * * * *